March 11, 1930.  R. T. ROMINE  1,750,128
TRAILER FOR AUTOMOBILE BODIES
Filed Sept. 3, 1926  5 Sheets-Sheet 5
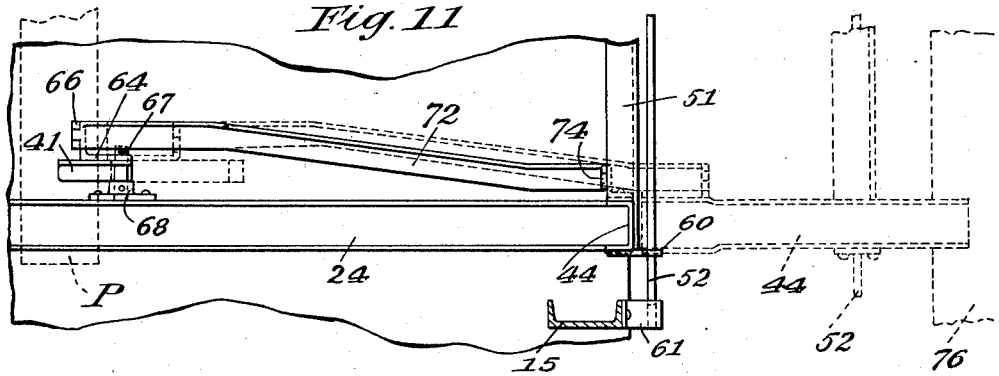
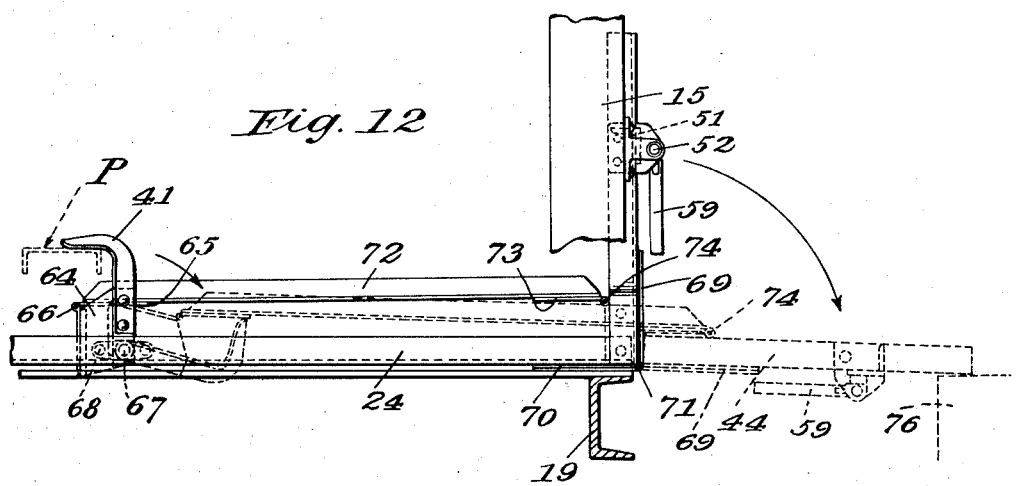
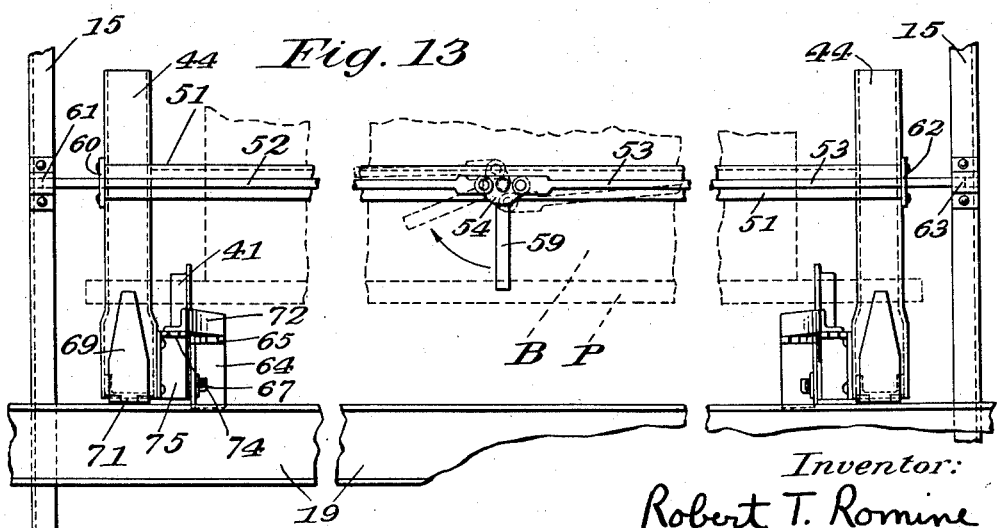
Inventor:
Robert T. Romine
By Macleod, Calver, Copeland & Dike
Attorneys.

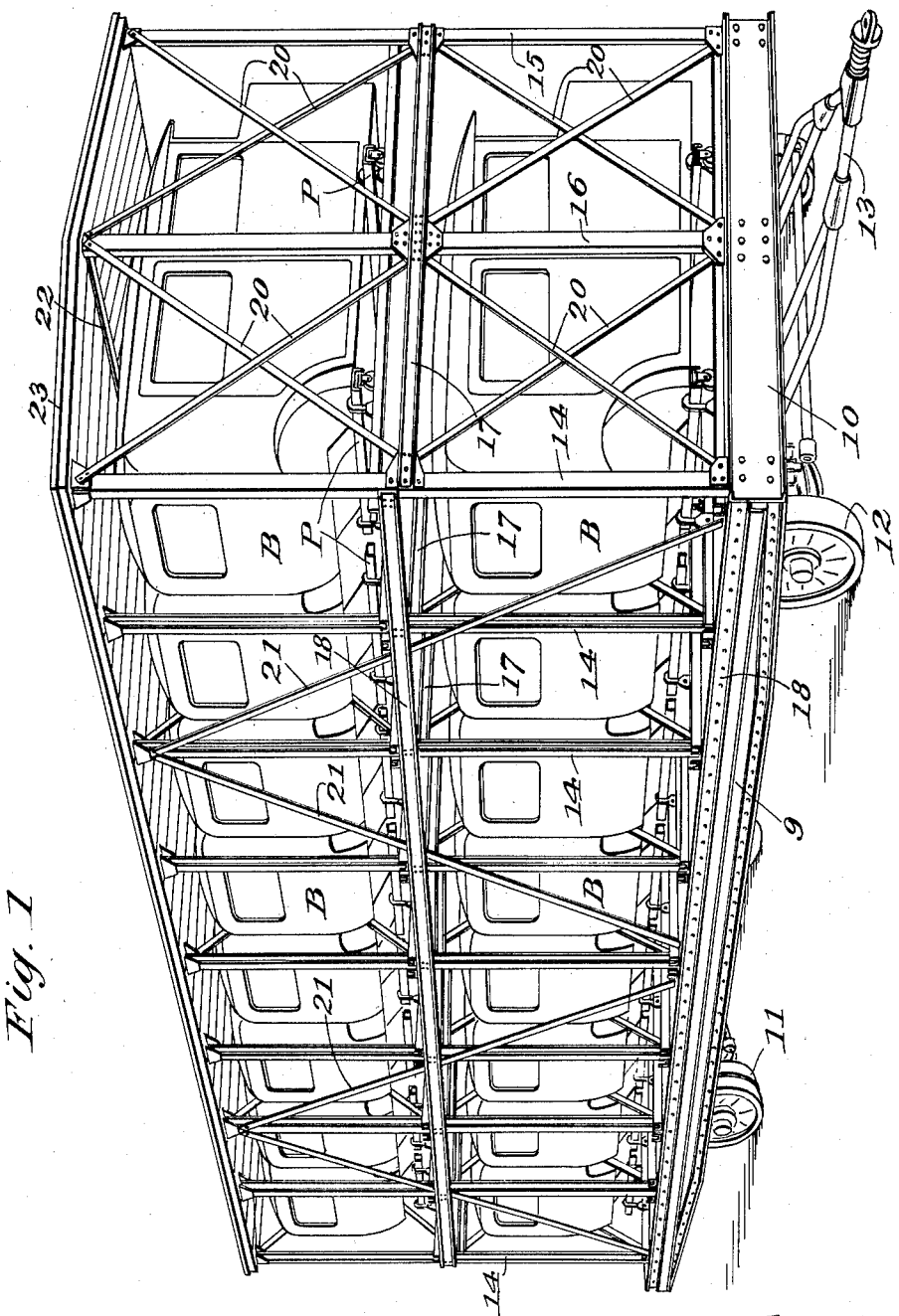

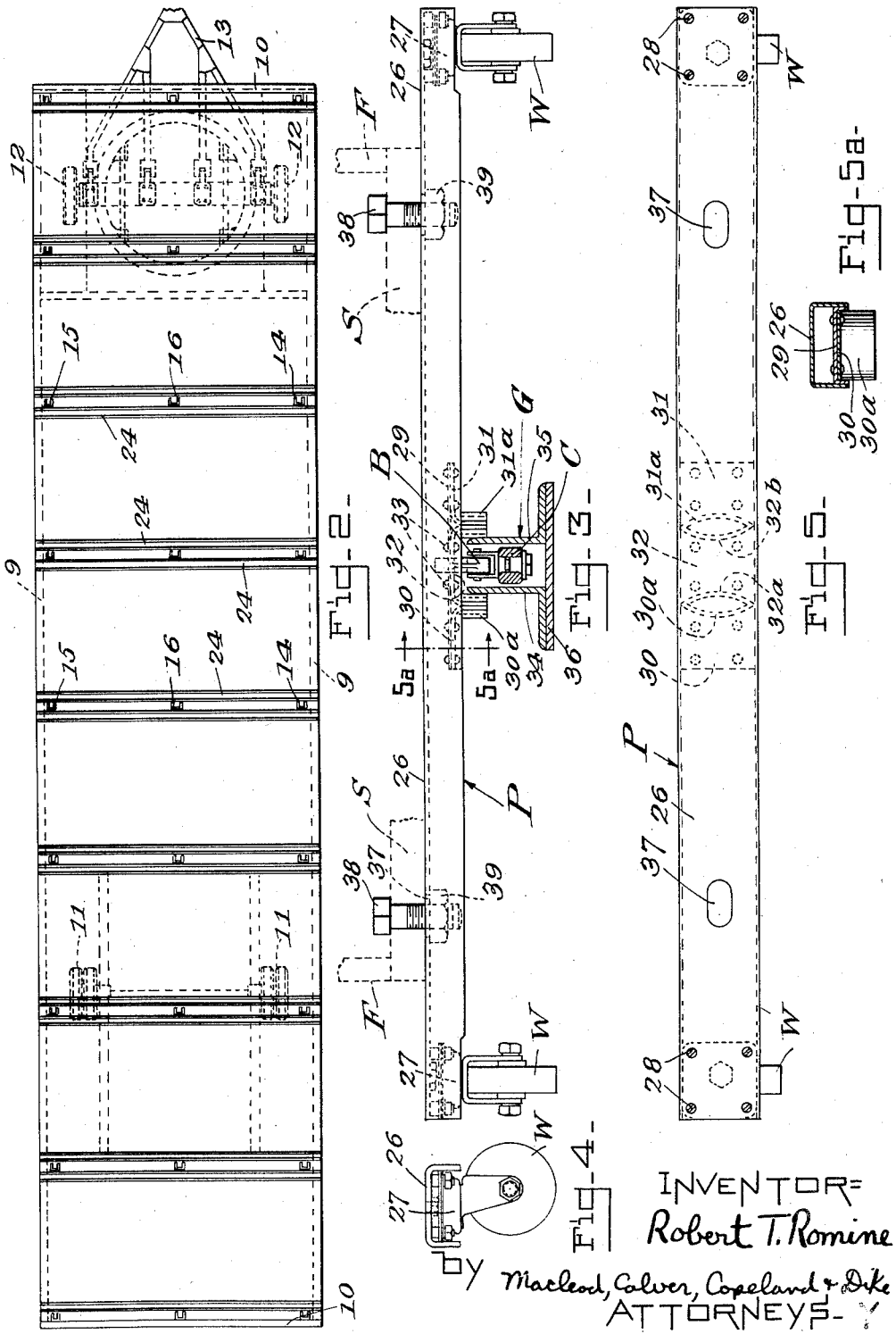

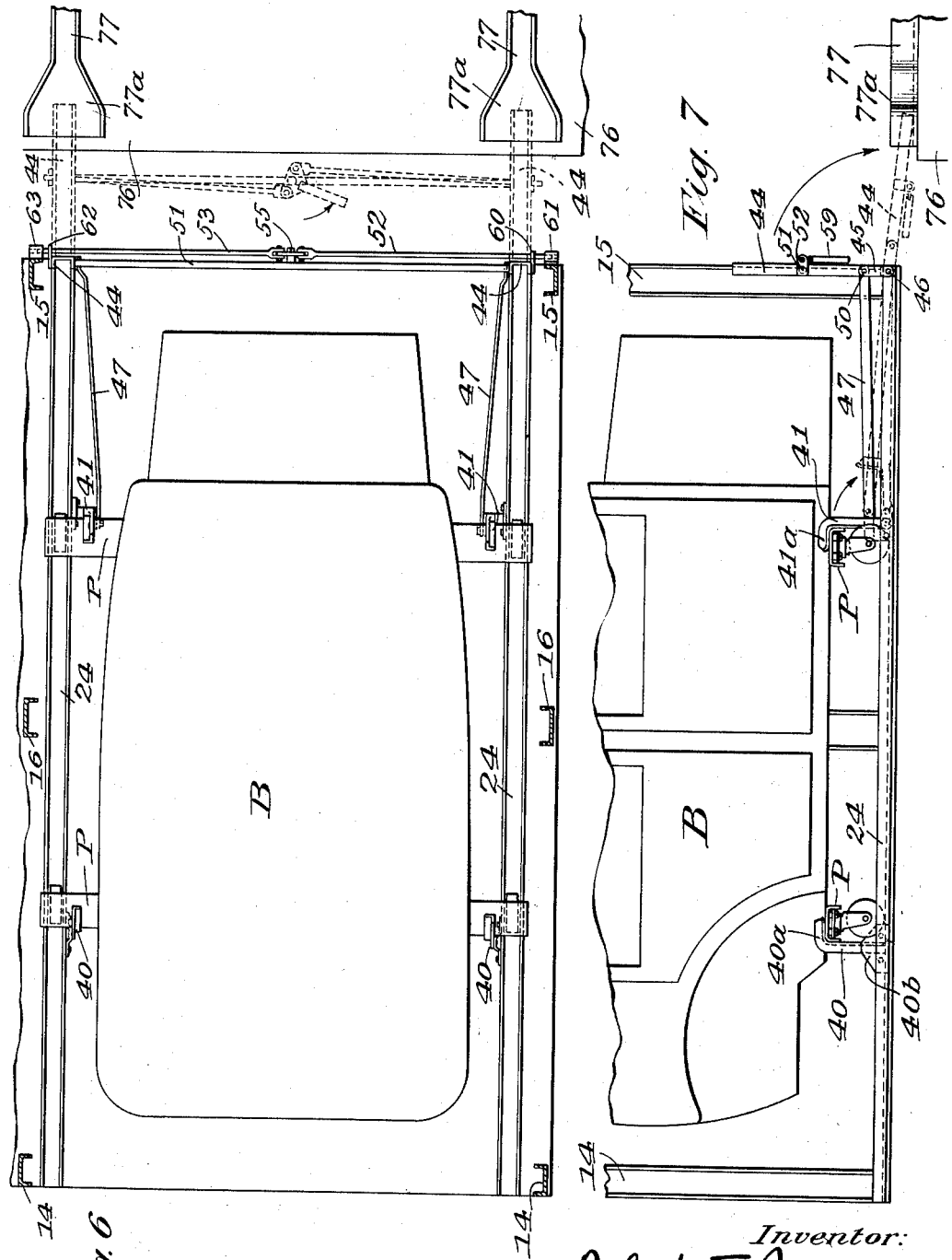

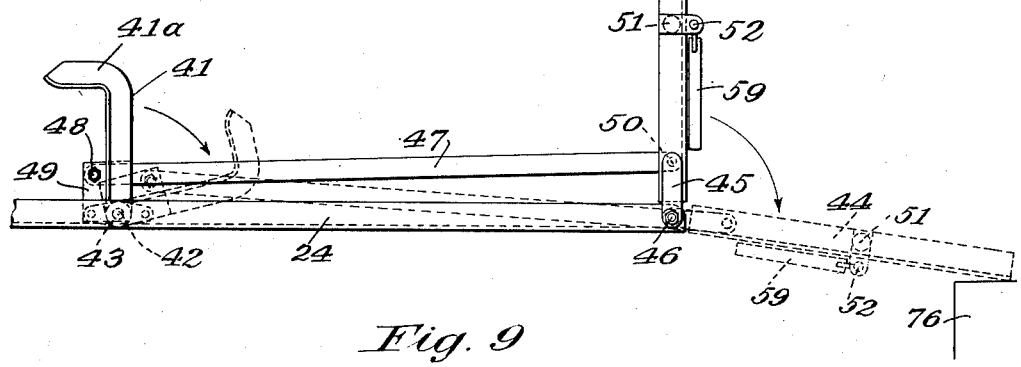
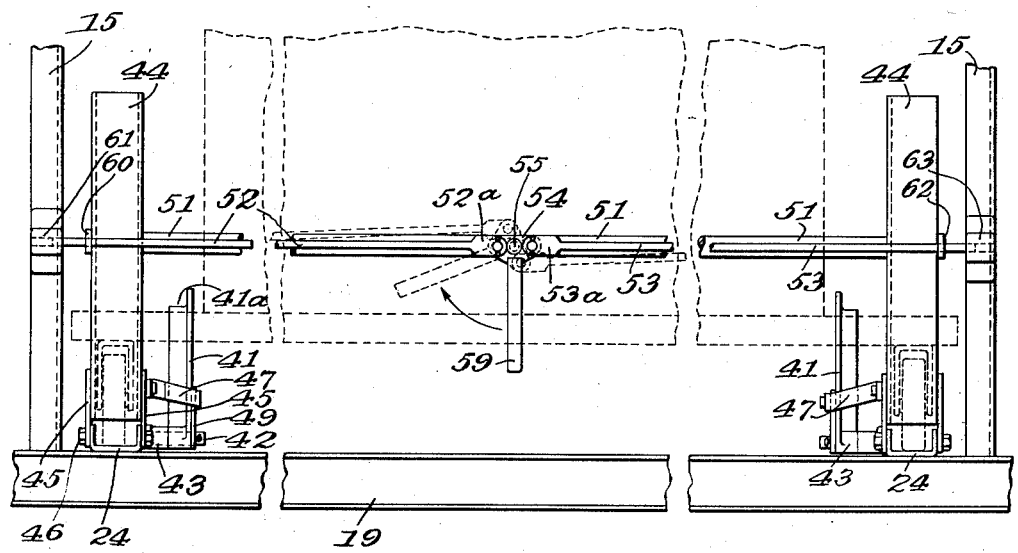
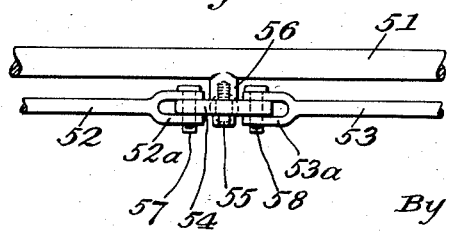

Patented Mar. 11, 1930

1,750,128

UNITED STATES PATENT OFFICE

ROBERT T. ROMINE, OF MOUNT CLEMENS, MICHIGAN, ASSIGNOR TO HUDSON MOTOR CAR COMPANY, OF DETROIT, MICHIGAN, A CORPORATION OF MICHIGAN

TRAILER FOR AUTOMOBILE BODIES

Application filed September 3, 1926. Serial No. 133,375.

This invention relates to the transporting of automobile bodies, and is particularly adapted for use in the automobile industry for transporting bodies from a plant where the bodies are built to the plant where they are assembled on the chassis of the cars.

The invention especially has for one of its objects the provision of a conveyance or car, such as a trailer for enabling a large number of bodies to be compactly and safely carried within a minimum space from one point to another and to be readily and easily loaded and unloaded from the conveyance.

A further object is to provide a conveyance for transporting automobile bodies in which the bodies may be loaded, transported and unloaded on casters or similar antifriction rollers, thereby eliminating the lifting of the bodies onto or off the conveyance, or dragging the bodies on their sills, which heretofore not only required considerable time and labor expense but resulted in damage to the enamel or paint finish of the bodies due to frequent handling or to the use of hoisting devices.

A further object is to provide a trailer constructed to permit the bodies to be loaded, transported, and unloaded in double-deck or superposed relation, thereby increasing the number of bodies which may be transported at one time.

Thus in accordance with the invention a series of bodies may be carried one above the other, on casters or paint sticks provided with casters; the bodies while on the caster wheels may be locked against movement on the trailer or car during transit, and the superposed bodies may be rolled out of the trailer simultaneously onto superposed or decked landings or elevators capable of receiving sets of bodies in decked or superposed relation.

A further object of the invention is to provide a conveyance capable of transporting automobile bodies on casters, wherein improved means is provided for locking the bodies against movement on the casters during transit, and in which the locking means may be operated without touching the bodies or without requiring the workmen to handle the bodies or climb onto the conveyance around or between the bodies.

Other objects of this invention will appear in the following description and appended claims, reference being had to the accompanying drawings forming a part of this specification, wherein like reference characters designate corresponding parts in the several views.

Fig. 1 is a perspective view illustrating a double-deck trailer embodying my invention.

Fig. 2 is a plan view showing either the upper or lower floor of the trailer.

Fig. 3 is a side elevation showing a paint stick on which the bodies are carried.

Fig. 4 is an end view of the construction shown in Fig. 3.

Fig. 5 is a plan view of the paint stick.

Fig. 5ª is a section taken on lines 5ª—5ª, of Fig. 3.

Fig. 6 is a fragmentary plan view, partly in section, showing any one of the body compartments and the manner in which the body is supported or locked in the compartment.

Fig. 7 is a fragmentary side elevation of the construction shown in Fig. 6.

Fig. 8 is a fragmentary side elevation illustrating in detail the locking mechanism for each compartment.

Fig. 9 is a fragmentary front view of a compartment showing the locking mechanism.

Fig. 10 is a detail plan view of the operating means for locking or unlocking the locking bolts.

Fig. 11 is a fragmentary plan view, partly in section, showing a somewhat modified form of locking means for each body compartment.

Fig. 12 is a fragmentary side view of the construction shown in Fig. 11.

Fig. 13 is a fragmentary front elevation showing this form of locking mechanism for each compartment.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

Referring to Fig. 1, the invention in its present preferred form is embodied in a double-deck trailer which in the present instance is divided into a series of eight lower compartments and a series of eight upper compartments enabling sixteen bodies to be carried or transported at one time. The trailer comprises a suitable chassis having longitudinal side sills 9 and end sills 10. Beneath the chassis are mounted the rear wheels 11 and the front steering wheels 12. The trailer may be drawn by means of a power driven tractor adapted to be connected to the draw-bar 13 which in turn is connected to the front steering wheels.

Mounted on the chassis is a framework divided longitudinally into a series of vertical sections, eight being shown in the present instance, and each of these sections in turn is divided horizontally into two series of upper and lower decks of compartments. The framework comprises a number of vertical structural channel beams 14 mounted in parallel relation on the chassis along the rear side of the vehicle. Mounted on the chassis at the front side of the vehicle are a corresponding series of vertical parallel channel beams 15. Intermediate the pairs of front and rear channels 14 and 15 are mounted vertical channel beams 16. Each set of channel frame members 14, 15 and 16 at the lower ends thereof are riveted to the chassis and connected together intermediate their top and bottom by transverse channel beams 17. The vertical frame members 14 at the rear of the framework are united by means of a lower longitudinal channel beam 18 and a similar beam 18 parallel thereto and equidistant between the lower and upper ends of the frame members 14. At the front of the vehicle are mounted upper and lower beams 19 similar to and on the same level as the beams 18. Each set of frame members 14, 15 and 16 are braced by means of suitable diagonal tie-bars 20. The framework is also strengthened at the front and rear thereof by means of diagonal tie-bars 21 and at the top by means of longitudinal brace members or tie-bars 22. Mounted on the framework is a roof 23.

Each lower and upper compartment is provided with supporting guides or ways for guiding the bodies into the compartments on casters and for confining the casters against any substantial turning movement during transit. In the present instance, each compartment is provided with a pair of parallel channels 24 extending transversely to the trailer, spanning the front and rear sills 18 and 19, and mounted thereon to form the supporting medium or floor for the automobile body. A pair of spaced ways 24 are therefore provided for each lower and upper compartment, sixteen sets therefore being provided in the trailer herein illustrated, and these channels or caster ways enable the body to be rolled into its compartment in the proper position, without danger of striking the frame so as to damage the enamel or paint finish of the body.

The automobile bodies are transported on caster wheels and this is accomplished in accordance with the present invention by mounting each body on front and rear transverse paint sticks each provided with caster wheels at the opposite ends thereof. Each paint stick P has preferably a greater length than the width of the body so as to project beyond opposite sides thereof. The caster wheels W of the paint stick are adapted to travel on the tracks or ways 24. As described in a co-pending application of mine, the automobile body may be built or assembled directly on the paint sticks and casters on an endless conveyor, a succession of bodies being thus assembled on the conveyor during its travel. A pair of paint sticks P are first placed in position on the conveyor buck, then during its travel the side bottom sills S of the body are detachably bolted to the paint stick bars. Thereupon the framework or panels F of the body are progressively built up on the sills S. When the body framework has been completely assembled, the endless conveyor is depressed at the end of its travel so as to permit the body to roll off the conveyor buck on its casters W.

After the panels or framework of the bodies have been assembled on the paint sticks P the trimming or upholstering work is then done to the interior of the body. This may be accomplished by conveying the bodies successively on the floor directly on the paint sticks P by means of a suitable chain conveyor C travelling in a stationary guide G on the floor of the plant (see Fig. 3). The paint stick as hereinafter described is provided with depending guides which embrace opposite sides of the stationary guide G, thereby causing the body to travel in a predetermined path along the assembly line where the trimming or upholstering work is done. The endless conveyor C is operated from a suitable source of power and the chain at intervals along its length has upwardly projecting pusher dogs B pivoted to the links of the chain and adapted to engage the paint stick bars so as to propel them together with the automobile bodies along the floor.

After the trim work has been done, the bodies may be propelled in double-deck relation directly on to the trailer and thence transported to the plant where the bodies are assembled with the chassis. Thus it will be seen that the bodies are at all times during the process of manufacture supported and carried on the paint sticks and casters, thereby facilitating the handling and assembling of the bodies, and eliminating any necessity of lifting or hoisting the bodies at any point in the process of manufacture.

In th present form each paint stick P comprises a channel bar 26 which extends in inverted position so as to provide a flat top supporting surface and depending flanges forming a channel way beneath the top of the bar 26. Within this channel way is housed at each end of the bar a casing 27 secured at 28 to the bar and to which is swivelled a caster wheel W. This construction enables the paint stick bar 26 to be supported as close as possible to the floor so that the body when supported on the paint stick will occupy a minimum of overhead space. The paint stick is provided centrally thereof with a pair of spaced depending guides. A channel strip 29 is located between the depending side flanges of the channel bar 26 and welded thereto. Riveted to the bottom of the member 29 is a plate 30 turned downwardly at its end and pressed to provide a curved portion 30$^a$. A similar plate 31 is riveted to the opposite end of the strip 29 and has a depending curved portion 31$^a$. Between these parts is positioned a plate 32 which is riveted at 33 to the channel strip 29 and the ends of this plate are bent downwardly to provide curved guides 32$^a$ and 32$^b$ which are bent reversely to the portions 30$^a$ and 31$^a$ and abutting against their end edges. These curved guides are adapted to straddle opposite sides of a stationary guide G on the floor of the plant. The guide G in the present instance comprises a series of longitudinally alined angles 34 and 35, the angles being mounted back to back but spaced to enable the conveyor chain C to operate therebetween. These angles may be mounted on a base plate 36 and secured thereto and to the floor of the building.

The top of the channel bar 26 adjacent each end thereof, is provided with a slot 37 and each body sill S may be detachably connected to the paint stick bar by means of a bolt 38 adapted to project through the slot 37 and secured to the paint stick by a nut 39. The slots 37 not only compensate for variations in the positions of the corresponding holes in the body sills through which the bolts 38 are inserted, but also enable the paint stick to be secured to bodies of different widths.

As shown in Fig. 6, each body is supported on front and rear paint sticks. Each body compartment is therefore provided with two sets of locking means, one set comprising a pair of rear fixed locking members 40 adapted to engage the opposite ends of the rear paint stick, and the other set comprising a front pair of movable locking members 41 adapted to releasably engage the opposite ends of the front paint stick.

Each rear locking member 40 is preferably constructed from an angle bar bent to provide a hook portion 40$^a$ adapted to project or hook over the top of the paint stick bar, as shown in Fig. 7. The lower end of the angle bar 40 is secured by means of a bracket 40$^b$ to the inner side flange of the guide channel 24.

Each locking member 41 preferably comprises an angle bar bent in like manner to provide a projecting hook portion 41$^a$. The hooked ends 40$^a$ and 41$^a$ of the front and rear locking members project toward each other when in locking position. The angle iron construction of the locking members provides a locking means of considerable strength and rigidity, preventing buckling of the locking members due to side stresses during transportation of the bodies. The lower end of the angle member 41 is pivoted or hinged (see Figs. 8 and 9) by means of a hinge pin 42 to a hinge bracket 43 riveted to the inner side flange of the channel 24. To the front end of each channel 24 is pivotally connected a channel extension 44. In the present instance this construction comprises hinge strips or plates 45 pivoted at 46 to opposite sides of each channel 24 and the upper ends of the strips 45 are welded to opposite sides of the extension bars 44. A link 47 is pivoted at 48 to a plate 49 which is secured to the inner face of the locking member 41. The opposite end of the link 47 is pivoted at 50 to the lower end of the channel bar 44.

From the foregoing construction, it will be seen that each extension bar 44 is swingably connected to the end of each guide channel 24 and adapted when projected into the dotted-line position of Fig. 8 to extend in prolongation of the guideway 24. In addition each extension 44 is connected to one of the locking members 41 so that when swung downwardly into the dotted-line position of Fig. 8, the locking member will be swung downwardly to the dotted-line position thereby releasing the paint stick bar.

The extension bars 44 are secured together by means of a transverse rod 51, so that by grasping the rod 51, each adjacent pair of extensions 44 for each compartment may be swung downwardly or upwardly in unison.

Locking mechanism is provided for releasably locking each pair of extension bars 44 in upright position, comprising a pair of normally alined locking bolts 52 and 53. These bolts terminate at their inner juxtaposed ends in forked portions 52$^a$ and 53$^a$ respectively, to which is pivoted an eccentric 54. This eccentric in turn is pivoted to turn on a stud bolt 55 screwed into a tapped hole in a lug 56 projecting from the rod or bar 51. The bolt 52 at its outer end is slidingly supported within a hole in an ear 60 secured to the channel 44. The bolt projects beneath the channel and is adapted to be locked in a hole or recess in a lug 61 secured to the frame bar 15. The other locking bolt 53 in like manner is slidingly supported adjacent its outer end in an ear 62 secured to the channel 44. The outer end of the bolt is adapted to be locked in a hole or recess in the lug 63.

Fixed to the eccentric 54 is a depending handle 59, so that by swinging this handle into the position shown in dotted lines in Fig. 9, the locking bolts 52 and 53 will be withdrawn from the locking recesses 61 and 63. Thereupon the bar 51 may be grasped and the extensions 44 swung downwardly so as to span the distance between the front side of the trailer and the landing 76, forming a bridgeway between the trailer and the landing to permit the bodies to be rolled directly from the trailer onto the landing.

Referring to the modified construction shown in Figs. 11 to 13 inclusive, an angle plate 64 forming one member of a hinge is secured to the inner flange of each of the swinging locking members 41. The other member of the hinge comprises a flat plate 65 connected to the hinge member 64 by means of a hinge pin at 66. Each locking member 41 at its lower end is pivoted or hinged by a transverse pin 67 to a hinge member 68 secured to the inner flange of the channel 24. Each channel extension 44 is swingingly connected to the outer end of each channel 24 by means of hinge plates 69 and 70 secured to the bottoms of the channels 44 and 24 respectively, and connected together by a hinge pin 71. Each extension 44 is operatively connected to one of the swinging locking members 41 by means of a link 72 in the form of an angle iron bar, the bottom flange of which is welded at its rear end to the top face of the hinge plate 65 and at its front end to the top face of a hinge plate 73. The latter is hinged at 74 to an angle plate 75 riveted to the outer face of the channel extension 44. The remainder of the locking mechanism, as shown in Figs. 11 to 13 inclusive, is substantially identical with that described above in regard to the construction illustrated in Figs. 6 to 10 inclusive.

When the operating handle 59 (see Fig. 13) is swung to the dotted-line position, the locking bolts 52 will be withdrawn from the sockets 61 and 63. Thereupon the workmen may grasp the connecting rod or bar 51 and swing the channel extensions 44 downwardly bringing them into alinement with the channel guideways 24 and spanning the distance between the side of the trailer and the landing 76. When the extensions 44 are swung downwardly to the dotted-line positions of Figs. 11 and 12, the locking members 41 will be swung away from the paint stick P and into the dotted-line position below the plane of the paint stick thereby permitting the body to be rolled out of the compartment and permitting the paint sticks to clear the hooks or locking members 41.

From the foregoing it will be seen that the trailer may be readily loaded after it has been brought into position along the side of the loading platform or landing 76. The hinged extensions or gangway members 44 for the upper and lower decks of compartments may be swung downwardly onto platforms or landings 76. Thereupon a series of bodies mounted on casters may be rolled from the landing 76 simultaneously into the several compartments. The loading platforms 76 are double-decked as in the case of the trailer so that the bodies may be rolled into the upper and lower compartments at the same time. The casters W carried by the front and rear paint sticks supporting each body will travel in the channel ways 24 until the rear paint stick bar engages the stationary hook or locking member 40, as shown in Figs. 6 and 7. Thereupon the workmen grasp the several bars 51 and swing the members 44 upwardly to the full-line position shown in Figs. 7 to 13 inclusive. The operating handles 59 are then swung downwardly to vertical position causing the locking bolts 52 and 53 for each compartment to be moved into the sockets 61 and 63, thereby locking the extensions 44 in upright position. This operation also results in swinging the locking members 41 upwardly so as to hook over the ends of the front paint sticks and rigidly clamp the front and rear paint sticks between the front and rear locking members. The bodies during transit are held against longitudinal movement by means of the locking members, and against lateral displacement by means of the flanges of the channels 24 confining opposite sides of the casters.

Each upper and lower loading or unloading platform or landing 76 is preferably provided with spaced guideways corresponding to the guide channels 24 into which the caster wheels of the paint sticks may be guided onto elevators or into the plant. Referring to Figs. 6 and 7, the upper and lower landings or platforms onto which the bodies are rolled from the upper and lower decks of the trailer, or from which the bodies are rolled into the trailer, are provided with spaced pairs of channel ways 77 corresponding to the guideways 24. Each of these preferably terminates in a flaring channel portion 77$^a$ of substantially greater width than the width of the extensions 44. The outwardly flaring guides 77$^a$ enable the members 44 to be lowered thereon in different lateral positions, thus preventing the necessity of manipulating the trailer so as to exactly line up the several sets of channels 24 with the corresponding channel ways 77 on the loading or unloading platform.

What I claim is:

1. A portable conveyance for transporting a series of automobile bodies, each body carried on front and rear bars having supporting rollers, said conveyance having fixed locking members engaging one of the bars and shiftable locking members engaging the other bar, and means for shifting said last named locking members beneath the bars to permit the body to be moved onto or off the conveyance.

2. In a conveyance for transporting automobile bodies on caster carrying members, the combination of a frame for supporting a series of bodies, a series of shiftable ways adapted to be projected beyond the side of the conveyance for guiding the bodies onto or off the conveyance, a series of fixed ways carried by the frame for guiding the casters into position on the conveyance, and means supported by the frame separate from said shiftable ways and operated by the latter to move into and out of position for releasably locking the bodies on the conveyance.

3. A conveyance for transporting automobile bodies, each on a pair of caster wheel bars, comprising fixed supports for the caster wheels of each pair of bars, fixed locking means for engaging a bar, movable locking means adapted to engage a bar, shiftable supports mounted on the conveyance in spaced relation from said movable locking means for conveying the bodies to or from said fixed supports, and devices for operating said movable locking means and supports in unison.

4. A conveyance for transporting automobile bodies, each on a pair of caster wheel bars, comprising fixed channel supports for the caster wheels of each pair of bars, fixed locking means engaging a bar, movable locking means adapted to engage the other bar, swinging channel supports supported in spaced relation from said movable locking means and adapted to be moved into prolongation of said fixed channel supports for guiding the caster wheels relatively thereto, and means for locking said swinging channel supports in upright position and for operating said movable locking means.

5. A trailer for transporting automobile bodies on caster bars, comprising means for supporting the bodies when rolled on the casters into position on the trailer, swinging locking members adapted to engage the caster bars, and means for swinging said members beneath the bars to permit the bodies to be rolled off the trailer, said last means including extension supports mounted on the trailer in spaced relation from said locking members for conveying the bodies between the trailer and a landing.

6. A conveyance for carrying automobile bodies supported on caster carrying members, comprising shiftable devices engageable with a member for locking the body, extension ways pivoted in spaced relation from said devices and adapted to be swung from upright position outwardly into position to overlie a loading platform, and shiftable means connecting said ways and said shiftable device for moving the latter into locking position when the ways are swung into upright position.

7. A conveyance for transporting a series of automobile bodies, each body carried on front and rear bars having supporting rollers, said conveyance having fixed locking members engaging one of the bars and swinging locking members engaging the other bar, and means for swinging said last named locking members beneath the bars to permit the body to be moved onto or off the conveyance.

8. A conveyance for carrying automobile bodies supported on caster carrying members, comprising a frame, locking devices, means for pivoting said devices to the frame to swing into position to lock said members, extension ways, means for pivoting said ways to the frame in spaced relation from said first named pivoting means to swing from upright position into extended position to overlie a loading platform, and shiftable means connecting said locking devices and extension ways for operating the same in unison.

In testimony whereof I affix my signature.

ROBERT T. ROMINE.